United States Patent
Papandreou et al.

[11] Patent Number: 5,498,022
[45] Date of Patent: Mar. 12, 1996

[54] VEHICLE INTERIOR WITH COLOR COORDINATED SUBSTRATE

[75] Inventors: John Papandreou; Shigeo Numata, both of Patchogue, N.Y.

[73] Assignee: Izumi Corporation, Yaphank, N.Y.

[21] Appl. No.: 425,725

[22] Filed: Apr. 20, 1995

Related U.S. Application Data

[63] Continuation of Ser. No. 266,269, Jun. 27, 1994, abandoned.

[51] Int. Cl.$^6$ ..................................... B60R 21/16
[52] U.S. Cl. ..................... 280/728.1; 280/731; 280/732
[58] Field of Search .................................. 280/732, 731, 280/728.1

[56] References Cited

U.S. PATENT DOCUMENTS

| | | | |
|---|---|---|---|
| 2,733,474 | 2/1956 | Capitani | 16/1 R |
| 3,904,222 | 9/1975 | Bursott et al. | 280/732 |
| 4,118,455 | 10/1978 | Byrn | 264/127 |
| 4,161,334 | 7/1979 | Sukup | 296/1.1 |
| 4,810,540 | 3/1989 | Ellison et al. | 428/31 |
| 5,059,639 | 10/1991 | Ohkura et al. | 523/205 |
| 5,132,148 | 7/1992 | Reafler | 427/393.5 |
| 5,169,725 | 12/1992 | Rasmussen et al. | 428/458 |
| 5,208,081 | 5/1993 | Gubitz | 428/31 |

*Primary Examiner*—Kenneth R. Rice
*Attorney, Agent, or Firm*—Stephen E. Feldman

[57] ABSTRACT

The basic material from which the steering wheel and the substrate from which a dash board of a motor vehicle are fabricated are colored a predetermined visible color. The dash board and steering wheel each have air bag assemblies mounted therein. The air bag container and air bag gate are also fabricated from a material that has been colored the same visible color as the color of the steering wheel and/or dash board in which the air bag assembly will be mounted. These components are color coordinated during assembly in a motor vehicle. The steering wheel, the dash board and the air bag container are finished or covered with a surface finish material that has the same visible color as the surface being finished so that when the finish material chips off the surface covered by the finish material, such as caused by deployment of the air bag, unsightliness caused by differences in visible color is avoided.

6 Claims, 1 Drawing Sheet

VEHICLE INTERIOR WITH COLOR COORDINATED SUBSTRATE

This is a continuation of Ser. No. 08/266,269, filed Jun. 27, 1994, now abandoned.

BACKGROUND OF THE INVENTION

1. Field of the Invention

The present invention relates to color compatibility between the decor of the interior of a motor vehicle and the color of the substrate forming a portion of the interior of the motor vehicle. In particular the present invention relates apparatus and methods for creating color compatibility between the paint or exterior coloring or decoration used on the interior of a passenger vehicle and the color of the substrate used for forming the interior of the passenger compartment.

2. Prior Art

It is well known that motor vehicles are designed and decorated for eye appeal. The interior of the driver/passenger compartment is especially designed and decorated for eye appeal, since the interior decor of the driver/passenger compartment is believed, by some vehicle marketing people, to be a major selling point in the sale of the vehicle. The major visual focal point of the interior of the driver/passenger compartment is that portion of the vehicle directly in front of the driver and front seat passenger, normally referred to as the steering wheel and steering column, the instrument panel and dash board. This portion of the vehicle's compartment appears to draw a large portion of the attention of persons in the purchasing market. The design and decor of the driver/passenger compartment of a vehicle is made to be comfortable, convenient and attractive, in eye appeal, for immediate sale purposes and for long range customer satisfaction in the purchased vehicle.

For many year the dash board of a vehicle, has been formed or fabricated using a substrate of fiber board or plastic. The substrate was covered with a soft padding material which had a "soft appearance". The padding covering the contoured surface of the dash board was originally added to the vehicle as a safety feature, to prevent or lessen the impact of a person being thrown forward as a result of a sudden or rapid stop of the vehicle. The padding on the dash board became a feature on the vehicle that was exploited in sales and advertising and soon became a feature that the purchasing public took for granted and even looked for in a motor vehicle.

More recently air bag assemblies have been introduced in motor vehicles. An air bag assembly, which includes the air bag retained in an air bag container with an air bag gate, through which the air bag is deployed, is mounted in the center of the steering wheel, in front of the driver of the vehicle and in the dash board in front of the front seat passenger of the vehicle. Most of the new motor vehicles marketed in the United States are equipped with one or more air bags which are used to prevent the person in front of whom the air bag is deployed, from coming in unwanted contact with that part of the vehicle immediately in front of such person, i.e., the steering wheel that is in front of the driver and the dash board, that is in front of the front seat passenger.

The driver side air bag is mounted in the center of the steering wheel and is deployed toward the head of the driver. The passenger side air bag is mounted in the dash board, essentially in front of the front seat passenger, and deployed toward the head and/or upper body of the front seat passenger.

An air bag is stored in an air bag container which includes an air bag gate through which the air bag is deployed. The air bag container is mounted with the air bag gate closed, and the surface of the gate flush with the surrounding surface of the steering wheel and dash board, respectively, so as to be compatible with the surrounding surfaces.

The use of a driver side air bag and a passenger side air bag in a vehicle obsolete the need for padding on the steering wheel and on the dash board. Further, padding normally used on the center of the steering wheel and on the dash board became a detriment to the deployment of air bags because the thick padding interfered with the air bag gate, during opening of the gate for deployment of the bag.

The removal of the padding material from the steering wheel and the dash board caused the surfaces on the steering wheel and the dash board to have a "hard" feel, which was substantially different from the "soft" feel people had become accustomed to and had expected in a motor vehicle. People purchasing new vehicles wanted the "soft" feel and the appearance of padding on the steering wheel and dash board.

In response to customer demand, a paint called Soft Swade paint was developed for use on the steering wheel and dash board of vehicles. Soft Swade paint is a trademark for a paint marketed by Sherwin-Williams Company of Chicago and is offered in different colors. It basically consists of Light Aromatic Naphtha, 4-Hydroxy, 4-Methyl, 2-Pentanone and Methyl Isobutyl Ketone. The paint, when applied to the surface of a steering wheel and/or to the surface of a dash board of a vehicle provides the appearance and "feel" of padding, without actual padding being added to these surfaces. Soft Swade paint appeared to provide the "look" and "feel" people demanded on the surfaces of the steering wheel and dash board of motor vehicles.

Soft Swade paint could be laid down in a relatively thin coat and was therefore applied to steering wheel and to dash boards in vehicles that had air bag assemblies mounted in the center of the steering wheel and in the dash board. This appeared to satisfy customers that demanded vehicles with air bag assemblies mounted in the steering wheels and in the dash boards and with steering wheel and dash board surfaces that "look" and "feel" as if the surfaces were padded. Using Soft Swade paint, manufacturers were able to lay down a thin coat of finish material on a surface over the air bag gate and the finish material did not interfere with the break out of the air bag from the container although the air bag passed through the finish material.

However, although Soft Swade paint has several desirable characteristics, it was found that Soft Swade paint, when applied to a surface and dried thereon, ruptured, cracked and chipped off the surface on which the paint was applied, when the surface was physically distorted. This translates into an undesirable condition. When Soft Swade paint is applied to and dries on the surface of the center of a steering wheel containing an air bag container gate or is applied to and dries on the surface of a dash board containing air bag container gate, portions of the paint will rupture, crack and chip off the steering wheel and off the dash board when the air bag gate opens to deploy the air bag. The rupture, cracking and chipping of the paint exposes the substrate on which the paint has been laid. It was found that when the cracking and chipping of the Soft Swade paint did occur, the steering wheel and/or the dash board of the vehicle became very unsightly because of the difference in the visible color between the finished surface of the steering wheel and/or the dash board and the visible color of the exposed substrate forming the respective component. When reference to color or visible color is made herein, one or more of the colors of the visible spectrum of light, for example, wavelengths of light in the range of 700 to 400 nanometers are intended to be included.

The problem of unsightliness of the exterior finish of the interior of a vehicle comes about because of the sharp contrast in color between the finished painted surface and the unpainted surface of the substrate where the paint chipped off the substrate. Although this condition may be temporary, because the chipped area can be repainted, it is a condition to be avoided because it has an adverse effect on customer satisfaction with the purchased vehicle and an adverse effect on repeat sales.

SUMMARY OF THE INVENTION

The present invention overcomes the problem of unsightliness of the finished surface of the interior of the passenger compartment of a motor vehicle, caused by a rupture, cracking or chipping of the finish on the surface, which results in a removal of a portion of the finish and a change in the visible appearance and/or color between the finish on the surface and the surface supporting the finishing material, by providing a material or substrate which has predetermined visible color so that the component fabricated from the material or substrate, such as a steering wheel or a dash board for a vehicle, or an air bag container used in a vehicle, for example, may have a visible color that may be color coordinated or color matched with the color of the finish on the surface of the component. For example, by fabricating a component such as a steering wheel, or a dash board and an air bag container and/or air bag gate from a material that is, or has been colored the same or substantially the same visible color as the visible color of the material used to provide a finish on the surface of the component, the unsightliness of an exposed portion of the substrate, resulting from a rupture, crack and/or chip in the finish on the surface of the component, will be substantially reduced. When practicing the present invention, the material used to provide the finish on a surface is preferably Soft Swade paint, although other paint or lacquer or other surface finishing material may be used.

OBJECTS OF THE INVENTION

It is an object of the invention to provide a steering wheel for a vehicle, where the steering wheel has a predetermined visible color and to color coordinate or match the visible color of the steering wheel with the visible color of the material used to provide a visible finish on the surface of the steering wheel assembled into the motor vehicle.

Another object of the invention is to pre-color a material from which a steering wheel and/or dash board of a motor vehicle are fabricated so that the vehicle component or components fabricated from the material are a predetermined visible color, and color coordinate or match the visible color of the steering wheel and/or the dash board with the visible color of the material used to finish the surface of the steering wheel and/or dash board.

These and other objects of the invention will become apparent from reading the following detailed description of a preferred embodiment of the invention with reference to the accompanying drawings.

DETAILED DESCRIPTION OF THE INVENTION

Figure 1:
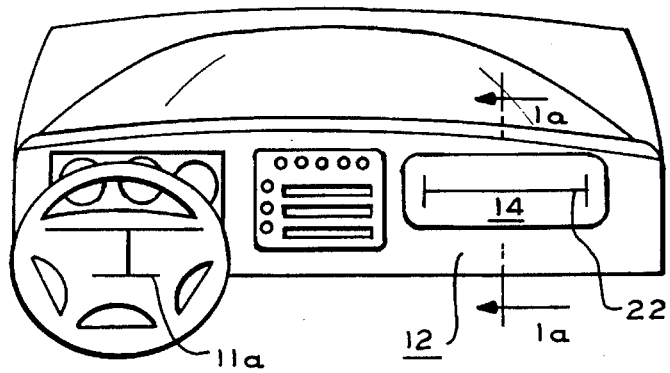
FIG. 1 is a representation, in pictorial view, of a dash board, instrument panel and steering wheel of a motor vehicle, viewed from the interior of the passenger compartment of the vehicle.

FIG. 1 represents the dash board, instrument panel and steering wheel of a motor vehicle as viewed from the interior of the passenger compartment of a motor vehicle, looking forward from the front seat, for example. A steering wheel 10 is represented with a center 11. The marking 11a, in the center of the steering wheel, represents the contour of the opening or gate, herein referred to as an air bag gate, in an air bag container mounted on the steering wheel. The air bag container, mounted in the steering wheel, stores the driver side air bag, which is deployed through the air bag gate. The center of the steering wheel, the area in which the air bag container is mounted, is decorated to match or conform with the decor of the interior of the motor vehicle. Customer appeal has dictated that the surfaces of the steering wheel and dash board have a "soft feel" and "soft look", such as found on padded steering wheels and padded dash boards. However, the presence and potential use of air bags in motor vehicles obsolete the use of padding on the interior surfaces protected by the air bags. Further, because of the thickness of padding material, any padding covering the air bag gate would interfere with rapid deployment of the air bag from the air bag container.

Preferably the surface of the center of the steering wheel and the surface of the dash board are decorated with a paint called Soft Swade paint, a product marketed by the Sherwin-Williams Company. Soft Swade paint, which is available in various visible colors, provides a finish that has the "soft feel" and "soft look" characteristics that appear to have customer appeal where the surface of a steering wheel, and the surface of a dash board of a motor vehicle are concerned. However, other paints, lacquers and other surface finishing materials, that provide a thin surface finish may be used, if desired.

Figure 1A:
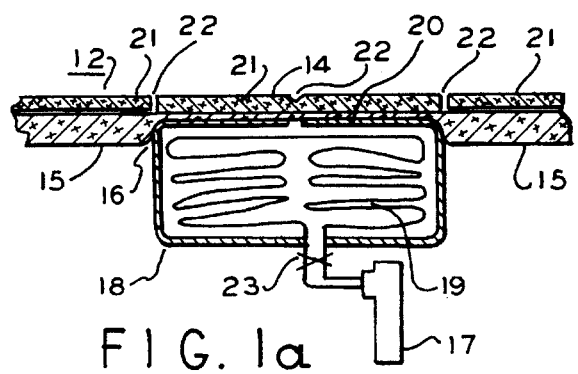
FIG. 1a is a representation, in cross section view, of the dash board in FIG. 1 along line a—a.

The dash board 12, in front of the passenger seat, has a passenger air bag assembly 14 mounted therein. FIG. 1a represents a cross section view along line a—a, which passes through the air bag assembly.

A substrate 15 is fabricated into the dash board, which has a hole or opening 16 in which an air bag container 18 is mounted. The air bag container retains or stores the air bag 19. The air bag is deployed through the air bag gate 20, which, when closed, lies substantially in the same plane or follows the contour of the surrounding dash board. The finishing material on the surface of the substrate forming the dash board is represented at 21. This may be Soft Swade paint and may be grooved, such as represented at 22. The groove or depression defines the breakout contour of the air bag gate 20, when the air bag is deployed, by inflation. The air bag is inflated by air under pressure in the air storage 17, when the switch 23 is opened.

It has been found that when an air bag is deployed, the air bag gate is forced open by the inflating air bag and, in the process, the gate, and the surrounding surface of the gate become physically distorted. This physical distortion occurs suddenly and with great force, resulting in the ruptures or cracks in the finish on the surface of the air bag gate and the surrounding surface, causing some of the finish material to chip, exposing portions of the surface covered by the finish material.

The material from which the substrate 15 is made is colored in some predetermined color of the visible spectrum, so that the substrate itself has visible color, for example, some wavelength or band of wavelengths within and/or outside the visible color spectrum of 400 to 700 nanometer-wavelengths. The visible color of the finishing material or paint and the visible color of the substrate is represented by cross hatching and is assumed to be substantially the same visible color.

Before the present invention the color of the substrate was not considered and was usually the same color for each vehicle of the same model vehicle, regardless of the interior design or decor. This is represented in FIG. 2a where the substrate 25 is represented as being in or having one visible color, represented by broken line hatching, and the color of the paint or finishing material is represented as being in or having another visible color, represented by X hatching.

Figure 2:
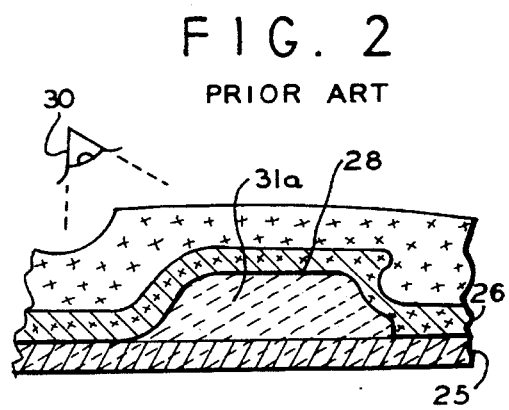
FIG. 2 is a representation, in cross section view of a rupture or chip in the finish of a surface, where the surface has been decorated using prior art techniques.
Figure 2A:
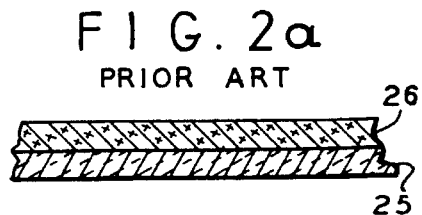
FIG. 2a is a representation, in cross section view, of a finished surface decorated using prior art techniques.

FIG. 2 represents a chip 28 in the paint or finish 26, which exposes a portion 31a of the surface of the substrate to the eye 30. Since the finish or paint is one color and the substrate is another, different color, the absence of finish or paint 31 on the substrate, in view of the surrounding finish, is noticeable and unsightly.

Figure 3:
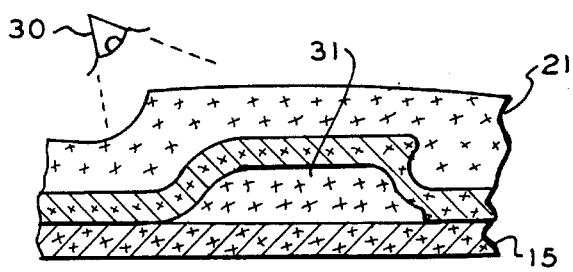
FIG. 3 is a representation, in cross section view, of a rupture or chip in the finish on a surface decorated using techniques taught by the present invention; and, FIG. 3a is a representation, in cross section view, of a finish on a surface decorated practicing the present invention.
Figure 3A:
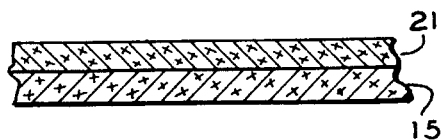

FIG. 3 represents a portion of a finished substrate, such as in FIG. 2 except in FIG. 3 the present invention has been practiced. The material from which the substrate 15 has been fabricated has been colored, or is some predetermined visible color so that the substrate is such predetermined visible color. The color of the substrate is represented by the X hatching. The color X, of the substrate is seen on the surface of the exposed portion 31, where the finish or finish coating 21 has ruptured and chipped away and the same color, X, is seen on the finish coating which remains of the substrate. The unsightliness of exposing two different visible colors is avoided.

The steering wheel and/or the substrate forming the dash board and/or the air bag gate and container may be made in predetermined visible color be adding a coloring or pigment to the material from which the respective component is fabricated. The coloring of the material or materials used to fabricate the components steering wheel, may be matched or coordinated with the color and/or decor of the interior of a particular vehicle so that the component or components fabricated from the respective materials and assembled into a particular motor vehicle, may be the same predetermined visible color as the paint or other finishing material used to finish the surface of those components assembled in the particular motor vehicle.

Although the preferred practice of the invention includes the use of Soft Swade paint as the finish material for covering or coating the surface of internal surfaces of the passenger compartment, other materials, such as paint, lacquer, plastic or other finishing material may be used when practicing the invention.

A preferred embodiment of the invention has been disclosed and described and some alternatives have been suggested. Other changes and modifications may be made, as will become apparent to those skilled in the art, without departing from the invention defined in the claims.

What is claimed is:

1. A color coordinated dash board assembly for a motor vehicle comprising:

a) a dash board in a passenger compartment of said motor vehicle said dash board fabricated from a material having a first unfinished surface having a predetermined visible color said predetermined visible color defined by one or more wave lengths of light in a range of wave lengths of light from 400 nanometers to 700 nanometers;

b) said dash board including an air bag assembly means mounted in said dash board;

c) said air bag assembly means including an air bag means, and an air bag container means for storing said air bag means in a deflated condition, said air bag container means including an air bag gate means for covering said air bag means, when said air bag means is deflated and for providing an opening in said dash board for emitting said air bag means, when said air bag means is inflated, said air bag gate means fabricated from a material having a second unfinished surface having said predetermined visible color; and d) a surface finishing means having said predetermined visible color, for color finishing said dash board so that the color of a finished surface of said dash board is the same color as said first unfinished surface and said second unfinished surface.

2. A color coordinated dash board assembly as in claim 1 and in which said air bag gate means in mounted on said air bag assembly so that said air bag gate means conforms to a contour of a surface of said dash board.

3. A color coordinated dash board assembly as in claim 1 and in which said surface finishing means is a paint and said paint is applied to a surface of said dash board.

4. A color coordinated steering wheel assembly for a motor vehicle comprising:

a) a steering wheel means, for steering said motor vehicle, mounted in a passenger compartment of said motor vehicle, said steering wheel means fabricated from a material having a first unfinished surface having a predetermined visible color defined by a band of wave lengths of light in a range of wave lengths of light from substantially 400 nanometers to substantially 700 nanometers;

b) said steering wheel means including and air bag mounting means for mounting an air bag assembly in an area of said steering wheel means;

c) said air bag assembly including an air bag means and an air bag container means and an air bag gate means, said air bag gate means fabricated from a material having a second unfinished surface having said predetermined visible color; and d) a surface finishing means having said predetermined visible color for covering said steering wheel means and said area of said steering wheel with a surface finish so that the color of said surface finish is the same color as said first unfinished surface and said second unfinished surface.

5. A color coordinated steering wheel assembly as in claim 4 and in which said air bag mounting means is mounted on said steering wheel with said air bag gate means conforming with a surface in said area of said steering wheel.

6. A color coordinated steering wheel assembly as in claim 4 and in which said surface finishing means is a paint having said predetermined visible color.

* * * * *